United States Patent
Gruhl et al.

(10) Patent No.: US 7,730,061 B2
(45) Date of Patent: Jun. 1, 2010

(54) FAST-APPROXIMATE TFIDF

(75) Inventors: Daniel F. Gruhl, San Jose, CA (US); Christine M Robson, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/209,450

(22) Filed: Sep. 12, 2008

(65) Prior Publication Data

US 2010/0070495 A1 Mar. 18, 2010

(51) Int. Cl.
G06F 7/00 (2006.01)
G06Q 10/00 (2006.01)

(52) U.S. Cl. ............................... 707/723; 705/1
(58) Field of Classification Search ............ None
See application file for complete search history.

(56) References Cited

U.S. PATENT DOCUMENTS

| | | | | |
|---|---|---|---|---|
| 5,263,159 | A | | 11/1993 | Mitsui |
| 5,621,454 | A | * | 4/1997 | Ellis et al. ............... 725/22 |
| 5,675,819 | A | * | 10/1997 | Schuetze ................ 704/10 |
| 6,006,221 | A | * | 12/1999 | Liddy et al. .............. 707/5 |
| 6,233,575 | B1 | | 5/2001 | Agrawal et al. .......... 707/6 |
| 6,499,030 | B1 | * | 12/2002 | Igata ..................... 707/6 |
| 6,564,210 | B1 | * | 5/2003 | Korda et al. ............ 707/3 |
| 6,970,863 | B2 | | 11/2005 | Cragun et al. |
| 7,146,356 | B2 | * | 12/2006 | Choi et al. .............. 707/3 |
| 7,219,090 | B2 | | 5/2007 | Travis, Jr. |
| 7,251,637 | B1 | * | 7/2007 | Caid et al. ............. 706/15 |
| 7,302,646 | B2 | * | 11/2007 | Nomiyama et al. ...... 715/764 |
| 7,392,262 | B1 | * | 6/2008 | Alspector et al. ........ 707/102 |
| 2002/0065957 | A1 | * | 5/2002 | Rubin ................... 709/330 |
| 2002/0072895 | A1 | * | 6/2002 | Imanaka et al. .......... 704/9 |
| 2002/0103809 | A1 | * | 8/2002 | Starzl et al. ............ 707/102 |
| 2002/0165873 | A1 | * | 11/2002 | Kwok et al. ............ 707/500 |
| 2002/0174101 | A1 | * | 11/2002 | Fernley et al. ........... 707/1 |
| 2003/0014405 | A1 | * | 1/2003 | Shapiro et al. ........... 707/5 |
| 2003/0033287 | A1 | * | 2/2003 | Shanahan et al. ......... 707/3 |
| 2003/0061025 | A1 | * | 3/2003 | Abir .................... 704/7 |
| 2003/0172058 | A1 | | 9/2003 | Namba |
| 2004/0064447 | A1 | * | 4/2004 | Simske et al. ........... 707/5 |
| 2004/0186826 | A1 | * | 9/2004 | Choi et al. ............. 707/3 |
| 2005/0010560 | A1 | * | 1/2005 | Altevogt et al. ......... 707/3 |
| 2005/0086254 | A1 | * | 4/2005 | Zou et al. .............. 707/102 |

(Continued)

FOREIGN PATENT DOCUMENTS

JP 2006244294 9/2006

OTHER PUBLICATIONS

Kushal Dave, Steve Lawrence and David M. Pennock, "Mining the Peanut Gallery: Opinion Extraction and Semantic Classification of Product Reviews", May 24, 2003.*

(Continued)

*Primary Examiner*—Neveen Abel Jalil
*Assistant Examiner*—Tarek Chbouki
(74) *Attorney, Agent, or Firm*—Suiter Swantz pc llo

(57) ABSTRACT

Our approach seeks to reduce the complexity of this type of calculation through approximation and pre-computation. It is designed to work efficiently with modern relational database constructs for content management. The approach is designed to enable the kinds of highly interactive data-driven visualizations that are the hallmark of third generation business intelligence.

12 Claims, 3 Drawing Sheets

U.S. PATENT DOCUMENTS

| | | | |
|---|---|---|---|
| 2005/0198076 A1* | 9/2005 | Stata et al. | 707/200 |
| 2005/0262050 A1* | 11/2005 | Fagin et al. | 707/3 |
| 2005/0278314 A1* | 12/2005 | Buchheit | 707/3 |
| 2006/0106767 A1 | 5/2006 | Adcock et al. | |
| 2007/0016574 A1 | 1/2007 | Carmel et al. | |
| 2007/0074131 A1* | 3/2007 | Assadollahi | 715/816 |
| 2007/0185858 A1* | 8/2007 | Lu et al. | 707/5 |
| 2007/0185871 A1* | 8/2007 | Canright et al. | 707/7 |
| 2007/0192293 A1 | 8/2007 | Swen | |
| 2007/0244915 A1* | 10/2007 | Cha et al. | 707/101 |
| 2007/0294220 A1* | 12/2007 | Tabraham | 707/3 |
| 2008/0005651 A1* | 1/2008 | Grefenstette et al. | 715/500 |
| 2008/0015844 A1* | 1/2008 | Fux et al. | 704/10 |
| 2008/0027918 A1* | 1/2008 | Altevogt et al. | 707/3 |
| 2009/0028441 A1* | 1/2009 | Milo et al. | 382/218 |
| 2009/0138466 A1* | 5/2009 | Henry et al. | 707/5 |

OTHER PUBLICATIONS

Petr Kroha and Ricardo Baeza-Yates, "A Case Study: News Classification Based on Term Frequency", 2005.*

Natalia Kozlowa, "Automatic ontology extraction for document classification", Feb. 2005.*

Lee, Dik Lun, et al., "Document Ranking on Weight-Partitioned Signature Files", ACM Transactions on Information Systems, 1996, vol. 14, No. 2, pp. 109-137.

Robertson, S.E., et al., "Okapi/Keenbow at TREC-8", pp. 1-11.

Dubinko, Michah, et al., "Visualizing Tags Over Time", WWW 2006, May 23-26, 2006, Edinburgh, Scotland, pp. 1-10, World Wide Web Conference Committee (IW3C2).

Vlajic, N., et al., "Categorizing Web Pages on the Subject of Neural Networks", Internet Innovation Centre, Department of Electrical and Computer Engineering, University of Manitoba, Winnipeg, Manitoba, Canada, pp. 1-11.

* cited by examiner 210 sorting the combined list generated by the union operation to create an ordered list of signature terms

FAST-APPROXIMATE TFIDF

TECHNICAL FIELD

The present disclosure generally relates to the field of document analysis, and more particularly to a method for generating an ordered list of signature terms occurring in at least a first document and a second document.

BACKGROUND

Traditional Term Frequency Inverse Document Frequency approaches are computationally intensive methods for identifying significant terms and phrases that differentiate specific documents from the rest of the corpus.

In finding unique terms and phrases for a set of search results, all of the documents in the result set are summed to create a result set frequency, this set is then sorted, and the top N terms or phrases are selected as the signature terms.

SUMMARY

Our approach seeks to reduce the complexity of this type of calculation through approximation and pre-computation. It is designed to work efficiently with modern relational database constructs for content management. The approach is designed to enable the kinds of highly interactive data-driven visualizations that are the hallmark of third generation business intelligence.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

We begin in the same manner as traditional TFIDF by computing the DF. We then sort the lists to bring the signature terms of the document to the front.

We then approximate this list by setting the top Q entries of the TFIDF to 1 and the rest to 0. We can make this approximation because of the Zipf's Law distribution of terms and phrases in English documents. This is additionally helpful from a computational standpoint because it moves the computation space out of floating point math and replaces it with simple sums over integers.

We then truncate the zero entries, leaving just the top terms. At this point we could also use a thesaurus for further term reduction.

This technique is most useful in cases where a novel set of results is generated as part of a user interaction. This is very typically the result when a search query is issued; a set of results is returned that a user may want to explore and understand. Given these search results, which constitute a document set within the corpus, we can take the union of all the sets of "indicative terms" for those documents. We then return the top M of them when requested. These are sorted to produce an ordered list of the signature terms of a result set.

This computation by contrast is order $q*(k+1)$ for a result set of size k and a threshold of q for the number of entries considered. This dramatic reduction in computation enables functionalities including 3rd generation business intelligence which require real-time interactivity.

Figure 1A:
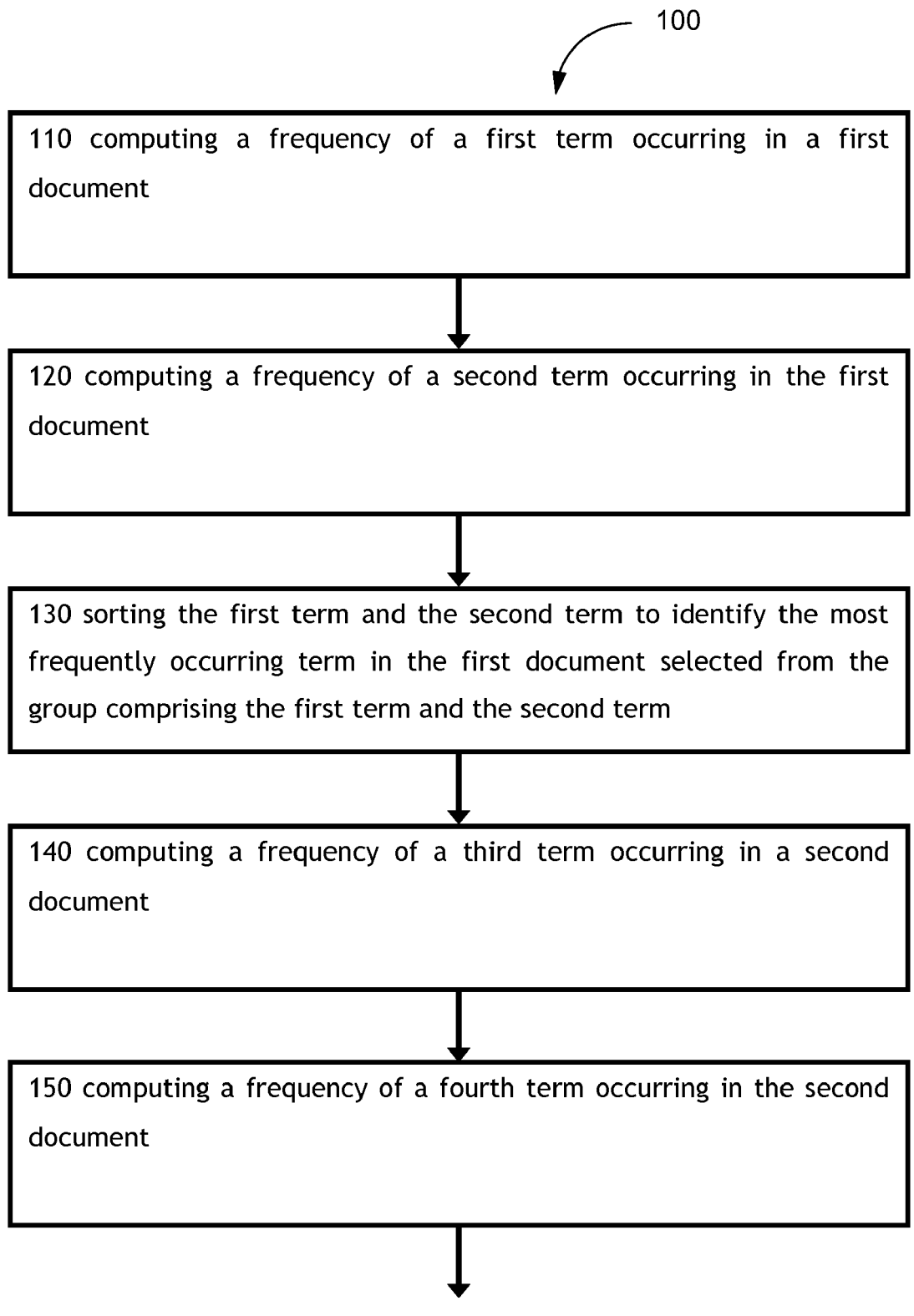
FIG. 1A is a flow diagram illustrating a method for generating an ordered list of signature terms occurring in at least a first document and a second document.
Figure 1B:
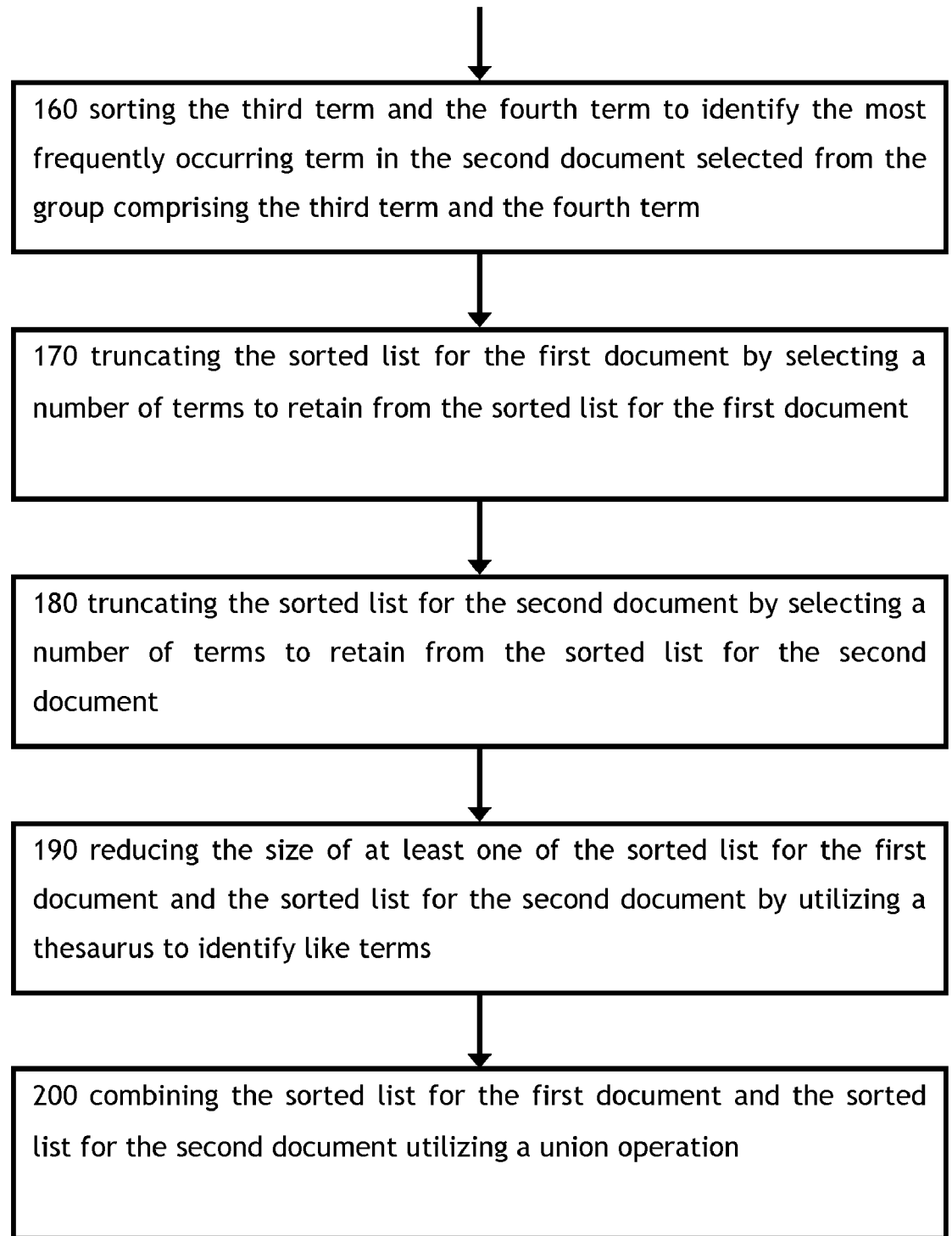
FIG. 1B is a flow diagram continuing the method illustrated in FIG. 1A.
Figure 1C:
FIG. 1C is a flow diagram continuing the method illustrated in FIGS. 1A and 1B.

Referring to FIG. 1, a method for generating an ordered list of signature terms occurring in at least a first document and a second document is described. First, a frequency of a first term occurring in a first document is computed, 110. Then, a frequency of a second term occurring in the first document is computed, 120. The first term and the second term are sorted to identify the most frequently occurring term in the first document, 130. A frequency of a third term occurring in a second document is computed, 140. A frequency of a fourth term occurring in the second document is computed, 150. The third term and the fourth term are sorted to identify the most frequently occurring term in the second document, 160. The sorted list for the first document is truncated by selecting a number of terms to retain from the sorted list for the first document, 170. The sorted list for the second document is truncated by selecting a number of terms to retain from the sorted list for the second document, 180. The size of at least one of the sorted list for the first document and the sorted list for the second document is reduced by utilizing a thesaurus to identify like terms, 190. Then, the sorted list for the first document and the sorted list for the second document are combined utilizing a union operation, 200. Finally, the combined list generated by the union operation is sorted to create an ordered list of signature terms, 210.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for generating an ordered list of signature terms occurring in at least a first document and a second document, comprising:

computing a frequency of a first term occurring in a first document;

computing a frequency of a second term occurring in the first document;

sorting the first term and the second term to identify the most frequently occurring term in the first document selected from the group comprising the first term and the second term;

computing a frequency of a third term occurring in a second document;

computing a frequency of a fourth term occurring in the second document;

sorting the third term and the fourth term to identify the most frequently occurring term in the second document selected from the group comprising the third term and the fourth term;

truncating the sorted list for the first document by selecting a number of terms to retain from the sorted list for the first documents wherein the sorted list for the first document includes a plurality of terms;

truncating the sorted list for the second document by selecting a number of terms to retain from the sorted list for the second documents wherein the sorted list for the second document includes a plurality of terms;

reducing the size of at least one of the sorted list for the first document and the sorted list for the second document by utilizing a thesaurus to identify like terms;

combining the sorted list for the first document and the sorted list for the second document utilizing a union operation;

sorting the combined list generated by the union operation to create an ordered list of signature terms;

receiving a signature term request, wherein the signature term request includes a number of top signature terms from the ordered list to be returned; and returning a number of top signature terms from the ordered list upon receipt of the signature term request.

2. The method of claim 1, further comprising:

assigning a value of one to at least one term in the first document based upon the frequency of the at least one term occurring in the first document, wherein the at least one term is identified as the most frequently occurring in the first document.

3. The method of claim 1, further comprising:

assigning a value of one to at least one term in the second document based upon the frequency of the at least one term occurring in the second document, wherein the at least one term is identified as the most frequently occurring in the second document.

4. The method of claim 1, further comprising:

assigning a value of zero to at least one term in the first document based upon the frequency of the at least one term occurring in the first document.

5. The method of claim 1, further comprising:

assigning a value of zero to at least one term in the second document based upon the frequency of the at least one term occurring in the second document.

6. The method of claim 1, further comprising:

retrieving a set of results, the set of results including at least one of the first document or the second document, wherein the set of results is generated from a search query.

7. A computer program product for generating an ordered list of signature terms occurring in at least a first document and a second document, comprising:

computer usable program code stored on a computer readable storage medium, the computer usable program code executed by a device, comprising:

computer usable program code configured to compute a frequency of a first term occurring in a first document;

computer usable program code configured to compute a frequency of a second term occurring in the first document;

computer usable program code configured to sort the first term and the second term to identify the most frequently occurring term in the first document selected from the group comprising the first term and the second term;

computer usable program code configured to compute a frequency of a third term occurring in a second document;

computer usable program code configured to compute a frequency of a fourth term occurring in the second document;

computer usable program code configured to sort the third term and the fourth term to identify the most frequently occurring term in the second document selected from the group comprising the third term and the fourth term;

computer usable program code configured to truncate the sorted list for the first document by selecting a number of terms to retain from the sorted list for the first document, wherein the sorted list for the first document includes a plurality of terms;

computer usable program code configured to truncate the sorted list for the second document by selecting a number of terms to retain from the sorted list for the second document, wherein the sorted list for the second document includes a plurality of terms;

computer usable program code configured to reduce the size of at least one of the sorted list for the first document and the sorted list for the second document by utilizing a thesaurus to identify like terms;

computer usable program code configured to combine the sorted list for the first document and the sorted list for the second document utilizing a union operation;

computer usable program code configured to sort the combined list generated by the union operation to create an ordered list of signature terms;

computer usable program code configured to receive a signature term request, wherein the signature term request includes a number of top signature terms from the ordered list to be returned; and computer usable program code configured to return the number of top signature terms from the ordered list upon receipt of the signature term request.

8. The computer program product of claim 7, further comprising:

computer usable program code configured to assign a value of one to at least one term in the first document based upon the frequency of the at least one term occurring in the first document, wherein the at least one term is identified as the most frequently occurring in the first document.

9. The computer program product of claim 7, further comprising:

computer usable program code configured to assign a value of one to at least one term in the second document based upon the frequency of the at least one term occurring in the second document, wherein the at least one term is identified as the most frequently occurring in the second document.

10. The computer program product of claim 7, further comprising:
    computer usable code configured to assign a value of zero to at least one term in the first document based upon the frequency of the at least one term occurring in the first document.

11. The computer program product of claim 7, further comprising:
    computer usable code configured to assign a value of zero to at least one term in the second document based upon the frequency of the at least one term occurring in the second document.

12. The computer program product of claim 7, further comprising:
    computer usable code configured to retrieve a set of results, the set of results including at least one of the first document or the second document, wherein the set of results is generated from a search query.

* * * * *